United States Patent Office 3,361,234
Patented Jan. 2, 1968

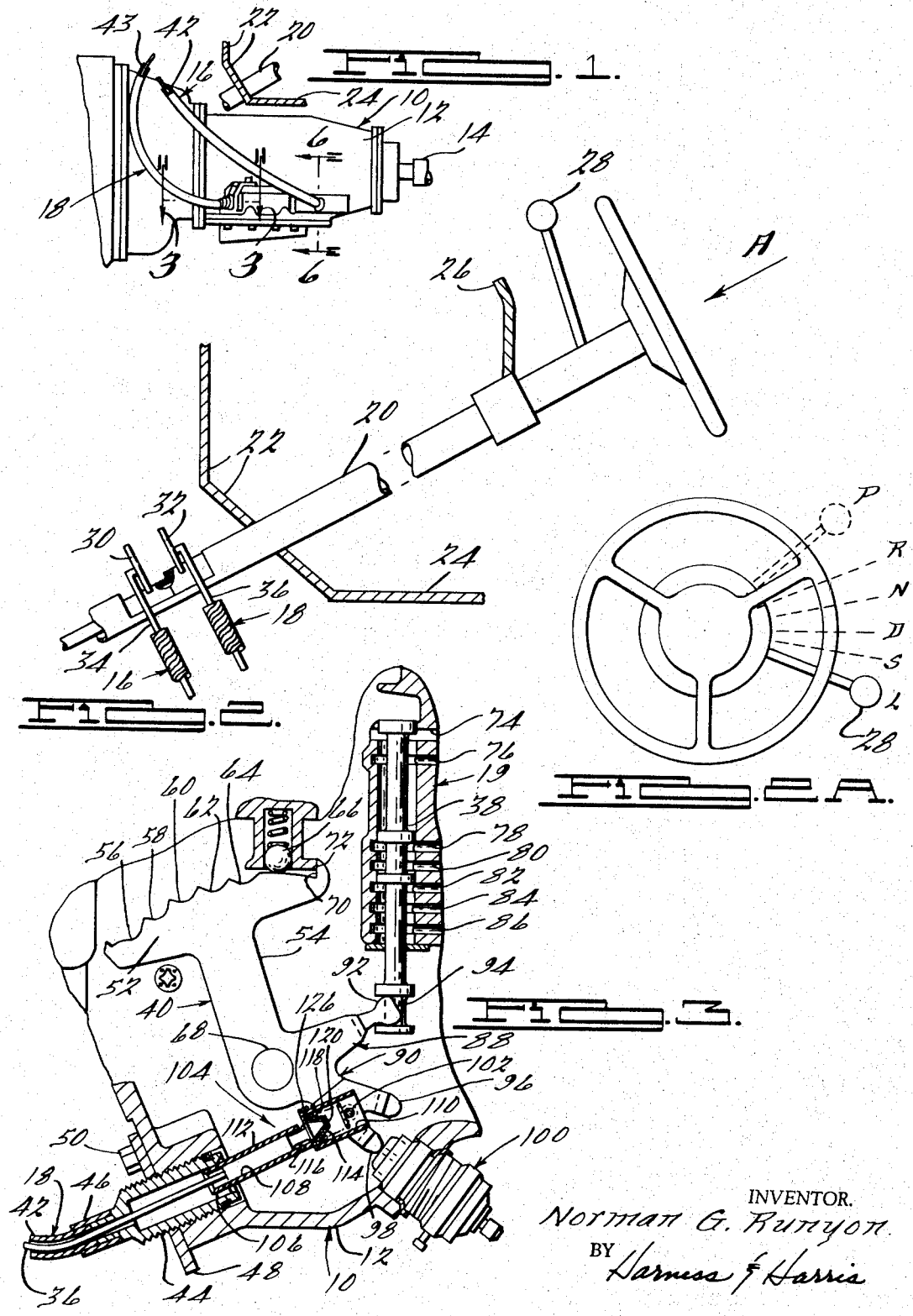

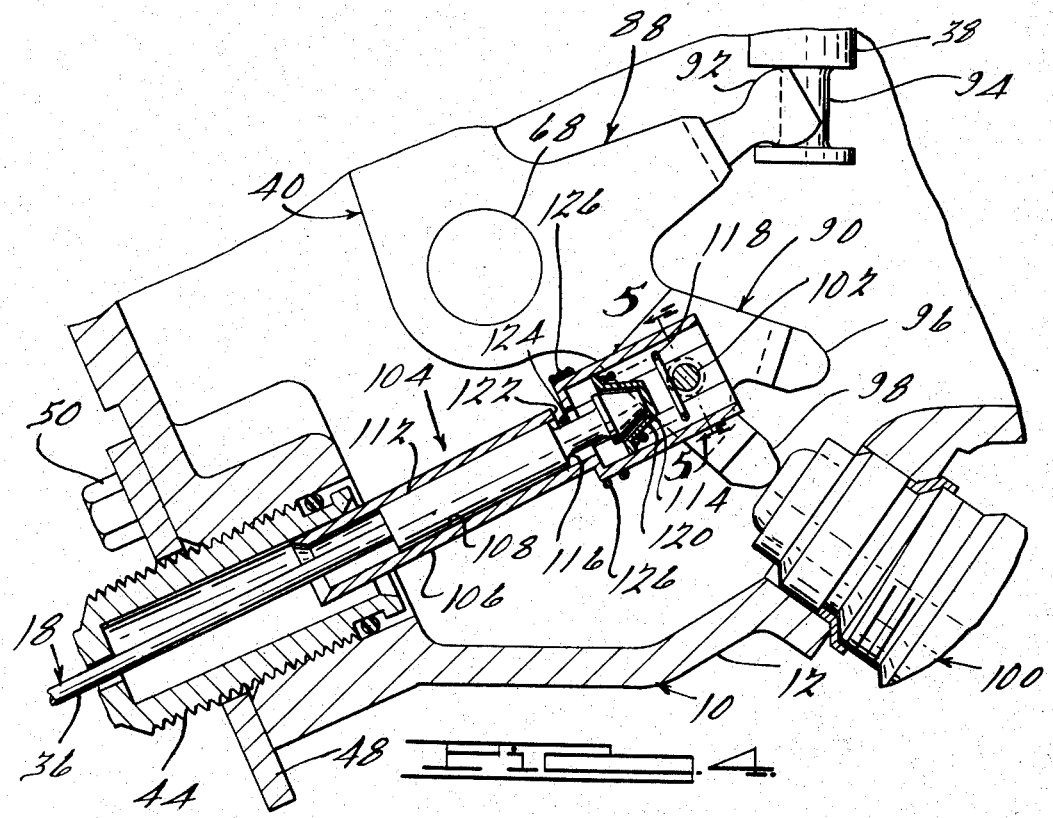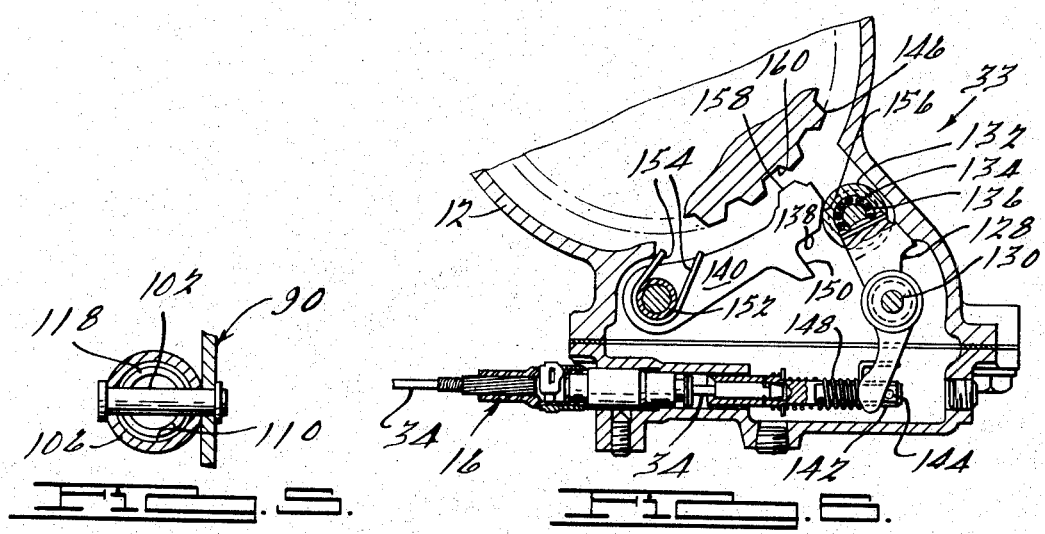

3,361,234
TRANSMISSION CONTROL MECHANISM
Norman G. Runyon, Detroit, Mich., assignor to Chrysler Corporation, Highland Park, Mich., a corporation of Delaware
Filed June 4, 1965, Ser. No. 461,269
7 Claims. (Cl. 192—4)

ABSTRACT OF THE DISCLOSURE

An automatic transmission control system in which a lost motion connection is provided in the control cable interconnecting the steering column mounted selector lever and the transmission control valve so that, upon movement of the selector lever to the "Park" position, the control valve will be moved into a neutral condition before engagement of the parking sprag and yet the selector lever may undergo further movement beyond this point to insure positive actuation of the parking sprag.

---

This invention relates generally to an automatic vehicle power transmission and more specifically to a control mechanism associated with such a transmission.

Automatic power transmissions are usually provided with means for enabling manual selection of a particular range or condition of transmission operation. Such manual means have taken the form of, for example, vehicle dash panel mounted push buttons, a steering column mounted selector lever or a console type floor mounted selector lever.

Automatic transmissions are also provided with hydraulic control valves for controlling transmission operation. Such control valves are usually connected by suitable linkages and/or cables to the manually operated selector means so as to assume predetermined positions for each respective selected position of the manual selector means.

Vehicles equipped with an automatic transmission are usually also provided with a parking mechanism which is actuated when the vehicle is not in motion and which functions to prevent the rotation of the transmission output shaft and, consequently, the ground-engaging driving wheels. In all of such transmissions equipped with parking mechanisms, the control valve must be first moved to a position similar to neutral in order to assure the venting of the hydraulic pressure within the transmission before the parking mechanism may be permitted to be actuated. In vehicles equipped with a steering column mounted manually operated selector lever, the lever must be moved some additional amount beyond what would be considered a neutral position in order to cause actuation of the associated parking mechanism.

In arrangements where the manually positioned selector means comprises a steering column mounted manually actuated selector lever, a problem stems from the fact that in such selector means the operator has only one lever with which to both control the position of the transmission control valve and also to actuate the parking mechanism (often referred to as the parking sprag). The essence of the problem appears to reside in the fact that in the use of column mounted selector lever arrangements, there is usually not the inherent ability of adjustment required to assure the positive actuation and engagement of the associated parking mechanism.

It should be appreciated that because of the necessary manufacturing and assembling tolerances, discrepancies will often exist as between any two transmissions as well as the vehicles for which the transmissions are intended, including the steering column selector levers employed therein. Such discrepancies can result in the steering column selector lever not having the ability to experience movement sufficient to assure positive actuation and engagement of the parking mechanism.

Accordingly, an object of this invention is to provide motion transmitting means between the steering column mounted type of manually actuated selector means and the transmission control valve which will consistently enable the positive actuation and engagement of the associated parking mechanism.

Another object of this invention is to provide in combination with a steering column mounted selector lever and in combination with an automatic transmission, lost motion connecting means which will enable sufficient additional movement of the steering column mounted selector lever to assure proper actuation of the control valve and parking sprag.

Other more specific objects and advantages of this invention will become apparent when reference is made to the following description and accompanying drawings wherein:

FIGURE 1 is a view illustrating a power transmission constructed in accordance with the teachings of this invention;

FIGURE 2 is a fragmentary view, partially in cross-section, illustrating a steering column mounted type of manual selector means adaptable for use in combination with the transmission of FIGURE 1;

FIGURE 2-A is a partial view taken in the direction of arrow A in FIGURE 2 illustrating the steering column and steering wheel and the relative positions to be assumed by the steering column mounted selector lever corresponding to various operating conditions of the associated automatic transmission;

FIGURE 3 is an enlarged fragmentary cross-sectional view taken generally on the plane of line 3—3 of FIGURE 1 and looking in the direction of the arrows;

FIGURE 4 is an enlarged fragmentary portion of FIGURE 3 illustrating some of the elements in a different operating position as compared to FIGURE 3;

FIGURE 5 is a fragmentary cross-sectional view taken generally on the plane of line 5—5 of FIGURE 4; and FIGURE 6 is an enlarged fragmentary cross-sectional view taken generally on the plane of line 6—6 of FIGURE 1.

Referring now in greater detail to the drawings, FIGURE 1 illustrates an automatic transmission 10 comprising an outer housing 12 having extending therefrom a power output shaft 14 for connection to the vehicle drive wheels (not shown). A cable assembly 16 is provided for actuating a parking sprag mechanism while a cable assembly 18 is provided for actuating and positioning the transmission control valve 19 (FIGURE 3). A steering column 20, a firewall 22 and a vehicle floor 24 are fragmentarily illustrated generally above the transmission 10.

In addition to portions of the firewall 22, floor 24 and a dash panel 26, FIGURE 2 illustrates the steering column 20 as being provided with a steering column mounted type of selector lever 28 which, through any appropriate linkages as are well known in the art extending axially of column 20, is operatively connected to radiating actuating levers 30 and 32. The actuating levers are, in turn, respectively connected to cores 34 and 36 of cable assemblies 16 and 18.

Steering column mounted type of selector levers per se are generally well known in the art and it suffices to say that any such selector lever arrangements known in the art can be employed, in accordance with the present invention, in combination with the transmission 10 and the control cable assemblies 16 and 18 associated therewith. In any column mounted type of selector lever arrangement commonly presently employed, provision is made in the linkages controlled thereby for enabling the selector lever to be moved to a position designated as Park, which is beyond the normal range of transmission operation. As the selector lever is moved into Park, suitable linkage means as illustrated by extending lever 30 is actuated which, in turn, causes actuation of the parking sprag mechanism.

As illustrated in FIGURE 3, the control valve assembly 19 comprises a slidable valve member 38 which may be selectively positioned at different stations respectively corresponding to different transmission operating conditions as selected by the steering column selector lever 28 of FIGURE 2. Valve member 38 is operatively connected, through a rotatable lever plate 40, to the cable assembly 18 which is generally comprised of an outer sheath or housing 42 and a core 36. The outer sheath 42 may be secured to an axially adjustable sheath anchor member 44 by any suitable means as a collar 46. The rotation of a nut 48, located externally of housing 12, causes axial adjustment of member 44. The nut may, of course, be secured to housing 12 by any suitable means such as screws as at 50.

An arcuate segment 52, formed at one end of arm 54 of lever 40, is provided with a plurality of recesses, 56, 58, 60, 62 and 64 which when brought into general juxtaposition with a spring loaded ball type detent 66, accommodate the ball 66 so as to offer some substantial resistance to angular movement of the lever 40 from the then assumed position. Rotation of lever 40 about pivot 68 to positions wherein detent 66 is sequentially received in recesses 56, 58, 60, 62 and 64 causes corresponding axial movement of control valve member 38 causing the transmission to be placed in low speed forward drive (L or Low), second speed forward drive (S or Second), high speed forward drive (D or Drive), neutral (N) and reverse drive (R or Reverse), respectively.

In addition to the recesses, segment 52 is also provided with a radially directed abutment portion 70 which is adapted to engage a cooperating abutment surface 72 whenever the transmission is to be placed in Park condition. The various passages 74, 76, 78, 80, 82, 84 and 86 are for control of hydraulic fluid so as to cause the transmission to be placed in one of the previously mentioned operating conditions in accordance with the axial position of valve member 38. The transmission condition illustrated by FIGURE 3 is that of Park.

As also seen in FIGURE 3, lever 40 is provided with additional arms 88 and 90. Arm 88 is provided with a generally spherical or rounded end portion 92 which is closely received within a spool like or circumferential recess 94 formed at the end of control valve member 38. Rotation of lever 40 causes rotation of arm end portion 92 resulting in axial movement of control valve member 38.

The other arm 90 has generally radially extending switch actuating end portions 96 and 98 which function to close a switch 100 of the vehicle ignition circuit when the transmission is placed in either Neutral of Park. The relative angular displacement of end portions 96 and 98 is such as to cause portion 96 to close switch 100 whenever lever 40 is rotated to where recess 62 is engaged by ball detent 66 (placing the transmission in Neutral) and to cause portion 98 to close switch 100 whenever lever 40 is rotated to a position causing abutting engagement between surface 72 and member 70 (placing the transmission in Park). This, as is well known in the art, precludes engine cranking whenever the transmission 10 is in any operating condition other than Park or Neutral, Lever 40 is pivotally connected as by a pin 102 to an adapter assembly 104 comprised of a tubular member 106 having a passageway 108 and a chamber 110 formed therein and communicating with each other. Passageway 108 is of a size and configuration which permits the slidable reception therein of a plunger-like member 112 formed on and secured to the end of core 36 of cable assembly 18.

Plunger 112 has its free end 114 preferably formed to be of a generally conical configuration and a portion 116 of reduced cross-sectional area generally inwardly thereof. A compression spring 118 is carried in chamber 110 contained generally between pin 102 and a movable conical spring cup 120 abuttingly engaging end 114 of plunger 112. As best seen in FIGURE 4, a slot 122 is formed in the wall portion of tubular member 106 in order to enable at least a portion of a coil 124 of a retainer spring 126 to be passed therethrough. The coil 124, or portion thereof, accordingly serves the purpose of an abutment member which permits a predetermined maximum amount of relative axial movement between plunger 112 and tubular member 106. Accordingly, the operative connection as between lever 40 and core 36 of cable assembly 18 is one of possible lost-motion depending on the particular operating conditions experienced.

Referring to FIGURE 6, it can be seen that the parking sprag mechanism 33 comprises an actuating arm 128 pivotally journaled on a shaft 130 which is suitably secured to the transmission housing 12. The upper portion of arm 128 is preferably bifurcated to receive a contacting wheel or cam follower 132 which may be the outer race of needle bearings 134 mounted on a shaft 136 secured in the sides of the bifurcated upper portion of the actuating arm 128. The contacting cam wheel 132 provides relatively frictionless contact with the bearing portion or cam surface 138 of a sprag arm 140. The lower end of sprag actuating arm 128 is preferably also bifurcated to receive the end 142 of the actuating cable core 34 of cable assembly 16. A laterally extending pin 144 is provided in end 142 to cause the sprag actuating arm 128 to be pivoted out of engagement with the bearing surface 138 of the sprag arm 140 when it is desired to release the sprag arm from the parking gear 146 which is operatively connected to the transmission output shaft 14. A spring 148 about cable end 142 urges the lower portion of actuating arm 128 into contact with pin 144 at all times other than when the cable core 34 is moved so far to the right that the wheel 132 bears against the stop 150 of the sprag arm 140.

The sprag arm 140 is pivotally journaled on a shaft 152 which is suitably secured to the transmission housing 12. An anti-bounce spring 154 constantly urges sprag arm 140 in a clockwise direction against wheel 132. Whenever the cable core 34 is moved a sufficient amount to the right, lever 128, through wheel 132, bears against surface 156 of sprag arm 140 causing arm 140 to rotate counter-clockwise against spring 154. Arm 140 is thusly rotated until tooth portion 158 of sprag arm 140 is received in a tooth receiving recess 160 formed in gear 146 at which time the transmission output shaft is secured against rotation.

In view of the above, it can be seen that cable assemblies 16 and 18, through levers 30 and 32, respectively, are required to perform separate functions, with 18 being required to continually position the control valve member 38 in accordance with operator dictates as transmitted by the steering column mounted manual selector lever employed in combination with the transmission 10. Also, cable assembly 16 must have an axial movement sufficient to properly and positively actuate sprag arm 140 when required. As previously stated, the control valve member 38 must be placed in a position which causes the transmission to be in a neutral condition before sprag arm 140 is actuated into engagement with gear 146.

As previously stated, in vehicles employing steering column mounted manual selector lever arrangements in combination with automatic transmissions provided with selector lever actuated parking sprags, the problem of achieving proper actuation of cable assemblies 16 and 18 becomes acute.

Accordingly, the invention as herein disclosed provides an arrangement whereby sufficient movement of valve member 38 is accomplished before the sprag arm 140 is actuated into engagement with gear 146. This is accomplished by means of the adapter 104.

For example, let it be assumed for purposes of illustration that the movement of lever 28 from the position illustrated in FIGURE 2–A towards the position illustrated therein in phantom line represents movement of cable assembly cores 36 and 34 generally to the right as viewed in FIGURES 3 and 6. Also, let it be assumed that lever 28 has been so actuated causing the lever 40 to have been rotated counter-clockwise about pivot 68 to the position illustrated in FIGURE 3 by virtue of cable core 36 being moved generally to the right. Because of the compression spring 118 carried within chamber 110, the conical end 114 of plunger 112 is held at a position furthermost away from connecting pin 102. Consequently, at the very instant that abutment portion 70 abuts against the abutment surface 72, adapter 104 and the elements comprising the adapter arrangement, will be in a position as illustrated in FIGURE 3. It should be noted that at this time valve member 38 through arm 88 has been moved axially a distance sufficient to assure the placement of transmission 10 in a neutral condition which, as previously stated is a requirement. Accordingly, in order to assure that this neutral condition is achieved prior to sprag arm 140 engaging gear 146, it becomes necessary to have valve member 38 complete its movement prior to sprag arm 140 being placed into engagement with gear 146. Sequential movement of these two controlling elements will produce the desired result. In order to accomplish this provision must be made for permitting the selector lever 28 to be capable of movement some amount beyond that point at which the elements assume the respective positions as illustrated in FIGURE 3. This provision is accomplished by the adapter connector 104 including the arrangement of the compression spring 118 and the annular recess 116 formed about plunger 112. It should be remembered that FIGURE 3 represents the instant at which control valve member 38 has moved sufficiently to assume its neutral position. In comparing FIGURES 3 and 4 it should be noted that the plunger 112 is moved axially relative to the tubular member 106 causing compression of spring 118. The difference in relative axial positions of plunger 112 and tubular member 106 is achieved by the additional movement of the selector 28 beyond that point at which the position of the elements as illustrated in FIGURE 3 was initially achieved. The additional movement, as illustrated in FIGURE 4, of plunger 112 is in effect a lost motion connection between the cable core 36 of cable assembly 18 and the control valve member 38. The lost motion obtained thereby permits additional movement of the selector lever and permits the additional axial movement of cable core 34 of cable assembly 16 so as to rotate sprag actuating arm 128 about its journal 130 thereby rotating sprag arm 140 about its pivot 152 into engagement with a tooth recess 190 of gear 146.

Although but one preferred embodiment of the invention has been disclosed and described it is apparent that other embodiments and modifications are possible within the scope of the appended claims.

I claim:

1. In an automotive vehicle, the combination of a vehicle steering column, an automatic transmission for conveying power to propel said vehicle, a variably positioned control valve for determining the range of transmission operation, a parking brake mechanism for at times preventing rotation of a transmission power output shaft, a manually positionable transmission selector lever mounted on said steering column, said selector lever being positionable into any of a plurality of positions each of which corresponds to a particular range of transmission operation, said selector lever also being positionable into a further position so as to actuate said parking brake mechanism, first motion transmitting means operatively connecting said selector lever to said transmission control valve, and second motion transmitting means operatively connecting said selector lever to said parking brake mechanism, said first motion transmitting means including lost motion connecting means so as to enable overtravel of said first motion transmitting means during such periods as when said selector lever is being moved to said further position for actuation of said parking brake mechanism.

2. In an automotive vehicle, the combination of a vehicle steering column, an automatic transmission for conveying power to propel said vehicle, a variably positioned transmission control valve for determining the range of transmission operation, a parking brake mechanism for at times preventing rotation of the transmission power output shaft, a manually positionable transmission selector lever mounted on said steering column, said selector lever being positionable into any of a plurality of positions each of which corresponds to a particular range of transmission operation, said selector lever also being positionable into a further position so as to actuate said parking brake mechanism, a first motion transmitting cable operatively connecting said selector lever to said transmission control valve, and a second motion transmitting cable operatively connecting said selector lever to said parking brake mechanism, said first cable being operatively connected to said control valve through lost motion connecting means so as to enable overtravel of said first cable during such periods as when said selector lever is being moved to said further position for actuation of said parking brake mechanism, said lost motion connecting means comprising resilient means urging said first cable and control valve in opposite directions.

3. In an automotive vehicle, the combination of a vehicle steering column, an automatic transmission for conveying power to propel said vehicle, a variably positioned transmission control valve for determining the range of transmission operation, a parking brake mechanism for at times preventing rotation of the transmission power output shaft, a manually positionable transmission selector lever mounted on said steering column, said selector lever being positionable into any of a plurality of positions each of which corresponds to a particular range of transmission operation, said selector lever also being positionable into a further position so as to actuate said parking brake mechanism, a first motion transmitting cable operatively connecting said selector lever to said transmission control valve, and a second motion transmitting cable operatively connecting said selector lever to said parking brake mechanism, said first cable being operatively connected to said control valve through lost motion connecting means so as to enable overtravel of said first cable during such periods as when said selector lever is being moved to said further position for actuation of said parking brake mechanism, said lost motion means comprising a sleeve-like member operatively connected to said control valve for movement therewith, an end portion of said first cable slidably received within said sleeve member abutment means provided toward one end of said sleeve member for preventing withdrawal of said end portion from said one end, and resilient means carried by said sleeve toward the end opposite to said one end for continually engaging and urging said cable end portion in a direction toward said one end of said sleeve member.

4. In a vehicle, the combination of a vehicle steering column, an automatic power transmission mechanism including a power output shaft for conveying power to propel said vehicle, said transmission mechanism including a transmission control valve arrangement, said control valve arrangement comprising an axially positionable transmission control valve movable to any of a plurality of control positions in order to determine the range of operation of said transmissin mechanism, a first lever pivotally secured to said transmission mechanism and having one arm operatively connected to said control valve, said first lever including a second arm portion provided with a plurality of detent-receiving recesses for sequentially receiving a cooperating detent member as said first lever is pivotally rotated in order to position said control valve, an abutment portion carried by said first lever for engaging suitable relatively stationary abutment means in order to determine one extreme axial position of said control valve, a parking brake mechanism adapted to be at times actuated in order to prevent rotation of said power output shaft, a manually positionable transmission selector lever mounted on said steering column, said selector lever being positionable into any of a plurality of positions each of which corresponds to a particular range of transmission operation, said selector lever also being positionable into a further extreme position so as to actuate said parking brake mechanism, first and second linkage means operatively connected to said steering column mounted selector lever, motion transmitting first cable means operatively connecting said first linkage means and a third arm portion of said first lever, and motion transmitting second cable means operatively connecting said second linkage means to said parking brake mechanism, said first cable means being operatively connected to said third arm portion by lost motion connecting means for enabling said selector lever to move to said further extreme position in order to accomplish actuation of said parking mechanism even though said abutment portion and abutment means have engaged each other thereby resisting further movement of said first cable means.

5. In a vehicle, the combination of a vehicle steering column, an automatic power transmission mechanism including a power output shaft for conveying power to propel said vehicle, said transmission mechanism including a transmission control valve arrangement, said control valve arrangement comprising an axially positionable transmission control valve movable to any of a plurality of control positions in order to determine the range of operation of said transmission mechanism, a first lever pivotally secured to said transmission mechanism and having one arm operatively connected to said control valve, said first lever including a second arm portion provided with a plurality of detent-receiving recesses for sequentially receiving a cooperating detent member as said first lever is pivotally rotated in order to position said control valve, an abutment portion carried by said first lever for engaging suitable relatively stationary abutment means in order to determine one extreme axial position of said control valve, a parking brake mechanism adapted to be at times actuated in order to prevent rotation of said power output shaft, a manually positionable transmission selector lever mounted on said steering column, said selector lever being positionable into any of a plurality of positions each of which corresponds to a particular range of transmission operation, said selector lever also being positionable into a further extreme position so as to actuate said parking brake mechanism, first and second linkage means operatively connected to said steering column mounted selector lever, motion transmitting first cable means operatively connecting said first linkage means and a third arm portion of said first lever, and motion transmitting second cable means operatively connecting said second linkage means to said parking brake mechanism, said first cable means being operatively connected to said third arm portion by lost motion connecting means for enabling said selector lever to move to said further extreme position in order to accomplish actuation of said parking mechanism even though said abutment portion and abutment means have engaged each other thereby resisting further movement of said first cable means, said lost motion connecting means comprising a generally tubular member pivotally secured to said third arm portion and slidably receiving therethrough an end portion of said first cable means, said end portion having formed peripherally therein an annular recess for engaging a suitable abutment member for preventing withdrawal of said end portion from said tubular member while permitting a limited degree of axial movement of said end portion relative to said tubular member, and spring means carried by said tubular member continually urging said end portion in one direction against said abutment member so as to provide for said relative axial motion in a direction opposite to said one direction.

6. In a vehicle, the combination of a vehicle steering column, an automatic transmission having an output shaft for propelling said vehicle, control means within said transmission for determining a range of transmission operation, a parking brake mechanism adapted for actuation in order to at times prevent rotation of said output shaft, a manually positionable steering column mounted transmission selector lever operatively connected to said control means and said parking brake mechanism, and lost motion connecting means operatively interconnecting said steering column mounted selector lever and said control means for enabling sufficient additional movement of said selector lever beyond the limits of movement normally determined by said control means in order to assure proper actuation of said parking brake mechanism.

7. In a vehicle, the combination of a vehicle steering column, a power transmission mechanism having an output shaft for propelling said vehicle, slidable means within said transmission for determining a range of transmission operation, a parking brake mechanism adapted for actuation in order to at times prevent rotation of said output shaft, a manually positionable steering column mounted transmission selector lever operatively connected to said slidable means and said parking brake mechanism, said selector lever being capable of being positioned in any of a plurality of positions each of which causes a different predetermined movement of said slidable means in order to determine a range of transmission operation, said selector lever also being positionable into an additional position different from said plurality of positions in order to actuate said parking brake mechanism, and lost motion connecting means operatively interconnecting said steering column mounted selector lever and said slidable means for enabling sufficient movement of said selector lever toward said additional position to assure proper actuation of said parking brake mechanism.

References Cited
UNITED STATES PATENTS

| | | | |
|---|---|---|---|
| 2,349,297 | 5/1944 | Neracher | 192—4 |
| 2,499,276 | 2/1950 | Mullins et al. | 192—4 |
| 2,770,326 | 11/1956 | Wayman | 192—4 |
| 3,001,618 | 9/1961 | McCordic et al. | 192—4 |

MILTON KAUFMAN, *Primary Examiner.*

DAVID J. WILLIAMOWSKY, *Examiner.*

C. J. HUSAR, *Assistant Examiner.*